United States Patent
Freemantle et al.

(10) Patent No.: US 11,828,206 B1
(45) Date of Patent: Nov. 28, 2023

(54) HYDRAULIC TENSIONER WITH EXTERNAL PIN AND RATCHET MECHANISM

(71) Applicant: BorgWarner, Inc., Auburn Hills, MI (US)

(72) Inventors: Paul Freemantle, Lansing, NY (US); Dale N Smith, Freeville, NY (US)

(73) Assignee: BORGWARNER INC., Auburn Hills, MI (US)

( * ) Notice: Subject to any disclaimer, the term of this patent is extended or adjusted under 35 U.S.C. 154(b) by 0 days.

(21) Appl. No.: 18/055,020

(22) Filed: Nov. 14, 2022

(51) Int. Cl.
| F01L 1/24 | (2006.01) |
| F16H 7/18 | (2006.01) |
| F01L 1/02 | (2006.01) |
| F16H 7/08 | (2006.01) |

(52) U.S. Cl.
CPC ............. *F01L 1/24* (2013.01); *F01L 1/022* (2013.01); *F16H 7/18* (2013.01); *F16H 2007/0812* (2013.01)

(58) Field of Classification Search
CPC ..... F16H 2007/0806; F16H 2007/0859; F16H 2007/0812; F16H 2007/0853; F16H 7/0848; F16H 7/08; F16H 2007/0855
USPC .......................................................... 474/110
See application file for complete search history.

(56) References Cited

U.S. PATENT DOCUMENTS

| 4,997,411 A | * | 3/1991 | Breon | F16F 1/08 474/138 |
| 5,785,619 A | * | 7/1998 | Nakakubo | F16H 7/08 474/138 |
| 5,989,139 A | * | 11/1999 | Dusinberre, II | F16H 7/08 474/111 |
| 5,993,341 A | * | 11/1999 | Anderson | F16H 7/0836 137/543.17 |
| 6,120,402 A | * | 9/2000 | Preston | F16H 7/08 474/110 |
| 6,126,563 A | * | 10/2000 | Simpson | F16H 7/0836 474/111 |
| 6,244,981 B1 | * | 6/2001 | Simpson | F16H 7/0848 474/138 |
| 6,312,351 B1 | * | 11/2001 | Simpson | F16H 7/0848 474/140 |
| 6,361,458 B1 | * | 3/2002 | Smith | F16H 7/0848 474/110 |
| 6,383,103 B1 | * | 5/2002 | Fujimoto | F16H 7/08 474/110 |

(Continued)

FOREIGN PATENT DOCUMENTS

| EP | 1794473 A1 | 6/2007 |
| EP | 1448914 B1 | 4/2008 |
| WO | 2010023010 A1 | 3/2010 |

*Primary Examiner* — Henry Y Liu
(74) *Attorney, Agent, or Firm* — Brown & Michaels, PC

(57) ABSTRACT

A hydraulic tensioner having a piston sliding around an outside surface of a pin or rod, so that the high pressure chamber for chain control is created by the area between the piston internal diameter and the rod outside diameter. A spring around the outside of the rod presses against the bottom of the piston, biasing the piston outward during low oil pressure conditions. Preferably, the piston is steel and the rod is aluminum, the reverse of prior art designs, which means that as temperature increases, the piston to bore clearance reduces. This can offset the oil viscosity reduction and maintain the same performance over operating temperatures.

12 Claims, 5 Drawing Sheets

(56) References Cited

U.S. PATENT DOCUMENTS

| | | | |
|---|---|---|---|
| 6,471,612 B2* | 10/2002 | Nakakubo | F16H 7/0836 474/110 |
| 6,695,730 B2* | 2/2004 | Amano | F16H 7/08 474/101 |
| 6,935,978 B2* | 8/2005 | Hayakawa | F16H 7/0836 474/110 |
| 6,945,889 B2* | 9/2005 | Markley | F16H 7/0848 474/111 |
| 8,512,184 B2* | 8/2013 | Perissinotto | F16H 7/0848 474/135 |
| 8,727,922 B2* | 5/2014 | Perissinotto | F16H 7/0836 474/110 |
| 8,740,736 B2* | 6/2014 | Kurematsu | F16H 7/0848 474/110 |
| 8,888,624 B2* | 11/2014 | Bauer | F16H 7/0848 474/110 |
| 9,022,887 B2* | 5/2015 | Mishima | F16H 7/0848 474/111 |
| 9,133,916 B2* | 9/2015 | Hofmann | F16H 7/0836 |
| 11,054,003 B2* | 7/2021 | Fuhrmann | F16H 7/08 |
| 2003/0139235 A1* | 7/2003 | Yamamoto | F16H 7/0836 474/101 |
| 2004/0266571 A1* | 12/2004 | Izutsu | F16H 7/0848 474/110 |
| 2007/0054767 A1* | 3/2007 | Yamada | F16H 7/0848 474/110 |
| 2008/0318718 A1* | 12/2008 | Namie | F16H 7/0848 474/110 |
| 2010/0120564 A1* | 5/2010 | Hartmann | F16H 7/1236 474/110 |
| 2010/0222167 A1* | 9/2010 | Chekansky | F16H 7/0848 474/110 |
| 2011/0028253 A1* | 2/2011 | Perissinotto | F16H 7/0848 474/135 |
| 2011/0111898 A1* | 5/2011 | Mishima | F16H 7/0848 474/101 |
| 2012/0040790 A1* | 2/2012 | Perissinotto | F16H 7/0836 474/110 |
| 2014/0187369 A1* | 7/2014 | Todd | F16H 7/0848 474/110 |
| 2015/0354674 A1* | 12/2015 | Markley | F16H 7/0848 474/110 |
| 2016/0061299 A1* | 3/2016 | Takagi | F16H 7/0848 474/101 |
| 2016/0084359 A1* | 3/2016 | Wigsten | F16H 7/0848 474/110 |
| 2016/0186838 A1* | 6/2016 | Kurematsu | F16H 7/08 474/110 |
| 2016/0369874 A1* | 12/2016 | Smith | F16H 7/0848 |
| 2017/0356529 A1* | 12/2017 | Simmons | F16H 7/0848 |
| 2018/0259044 A1* | 9/2018 | Ness | F16H 7/08 |
| 2019/0234494 A1* | 8/2019 | Cobb | F16H 7/0836 |
| 2019/0353228 A1* | 11/2019 | Sun | F16H 7/0834 |
| 2020/0018383 A1* | 1/2020 | Lu | F16H 7/0848 |

* cited by examiner

HYDRAULIC TENSIONER WITH EXTERNAL PIN AND RATCHET MECHANISM

BACKGROUND

The present invention relates to hydraulic tensioners, and more specifically to a hydraulic tensioner riding on an external pin with a ratchet mechanism.

Most current automotive hydraulic tensioners use a piston that fits into an internal bore in a tensioner body. High pressure oil in the bore biases the piston outward against an arm, providing tension to control a chain or belt drive timing system. Typically, the piston is aluminum and the body is steel.

Most timing drive applications require a ratchet mechanism to prevent the chain from jumping teeth either on cam or crank sprockets. However, this hydraulic tensioner configuration makes it challenging to use most traditional ratchet mechanisms.

Many prior art tensioner designs have a piston to bore clearance that increases when oil temperatures in the engine rise, due to the difference in thermal expansion coefficients between steel and aluminum. This, combined with viscosity reduction of the oil with temperature, means the performance of the tensioner changes with temperature, which is not desirable.

SUMMARY

According to one embodiment of the present invention, a hydraulic tensioner is disclosed. The hydraulic tensioner comprises: a body, a rod, a hollow piston, a moveable sleeve, an external spring, a ratchet clip, and a check valve.

The rod has a first end, a second end, an outer surface and an inner bore. The second end of the rod is affixed to the body. The inner bore of the rod defines a low pressure chamber of the tensioner. The hollow piston is slidably received around the outer surface of the rod, such that the piston slides relative to the outer surface of the rod. The hollow piston has a body defining an outer circumference and an inner bore, a first end and a second end. Between the first end and the second end on the outer circumference of the body is a top portion, a collar extending radially outwards to form a shoulder, a smooth portion, and a plurality of ratchet teeth, the inner bore of the hollow piston and the first end of the rod defining a high pressure chamber. The moveable sleeve surrounds the outer circumference of the body of the hollow piston and is aligned with the plurality of ratchet teeth. The moveable sleeve has a first end, a second end, and a bore defining a ratchet clip groove. The external spring is between the first end of the moveable sleeve and the shoulder of the collar of the hollow piston, providing a force between the moveable sleeve and the shoulder of the collar of the hollow piston, biasing the hollow piston outwardly relative to the body. The ratchet clip is received between the plurality of ratchet teeth and the moveable sleeve to engage the plurality of ratchet teeth and the check valve is received within the bore of the hollow piston and within the first end of the rod to control fluid flow between the low pressure chamber and the high pressure chamber.

In one embodiment, the body of the tensioner, the floating sleeve, and the rod are preferably made of aluminum and the piston is preferably made of steel. Forming the body of the tensioner, the floating sleeve, and the rod of aluminum and the piston of steel reduces clearance as temperature increases. In other words, tight clearances at a high temperature and loose clearances at cold temperatures. The materials of the tensioner as well as the design allow for a more stable tensioner performance over engine operating temperatures and allows for less dependency on high performance control devices to compensate for flow variability.

DETAILED DESCRIPTION

Figure 1:
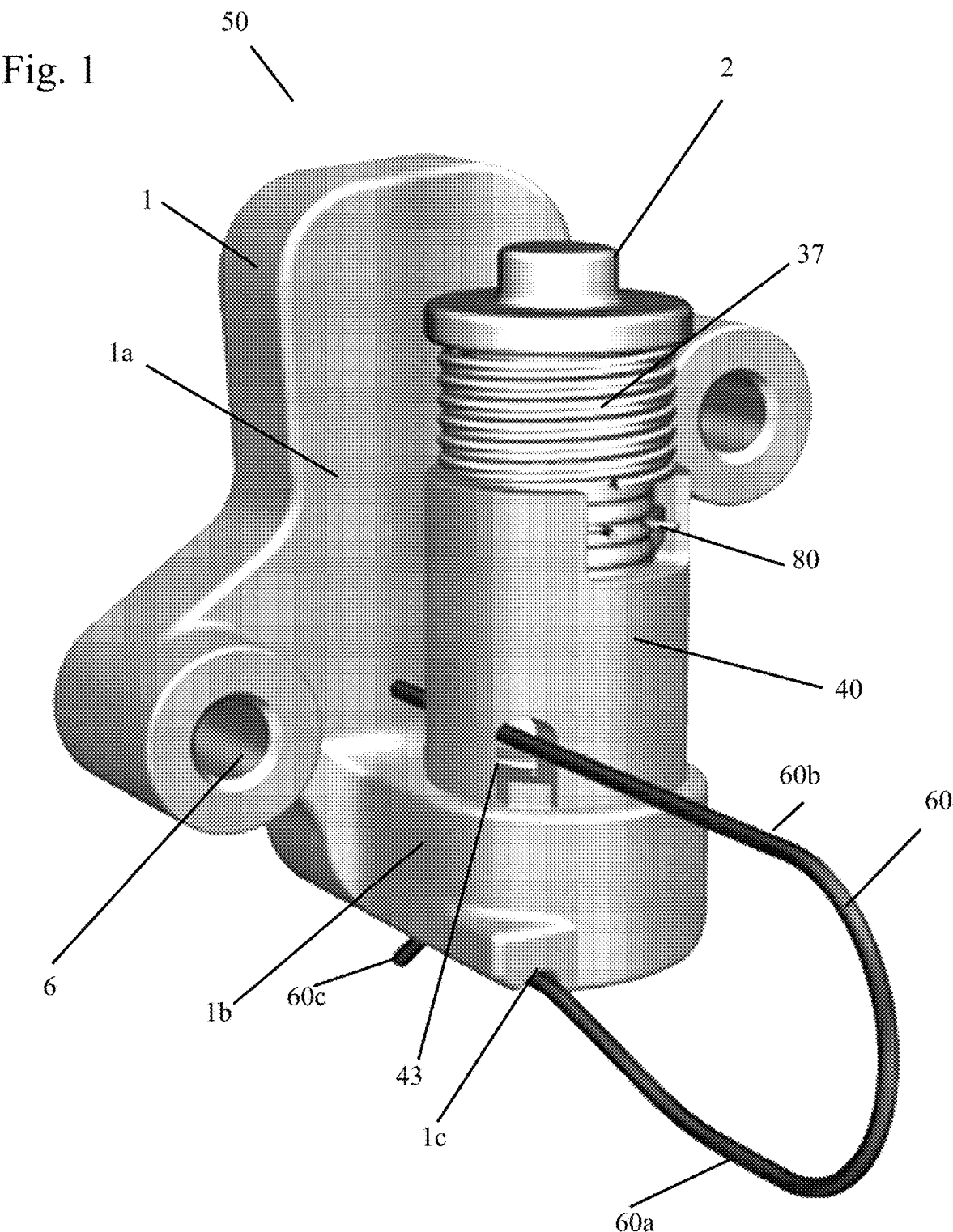
FIG. 1 shows a perspective view of the hydraulic tensioner of an embodiment of the present invention.
Figure 2:
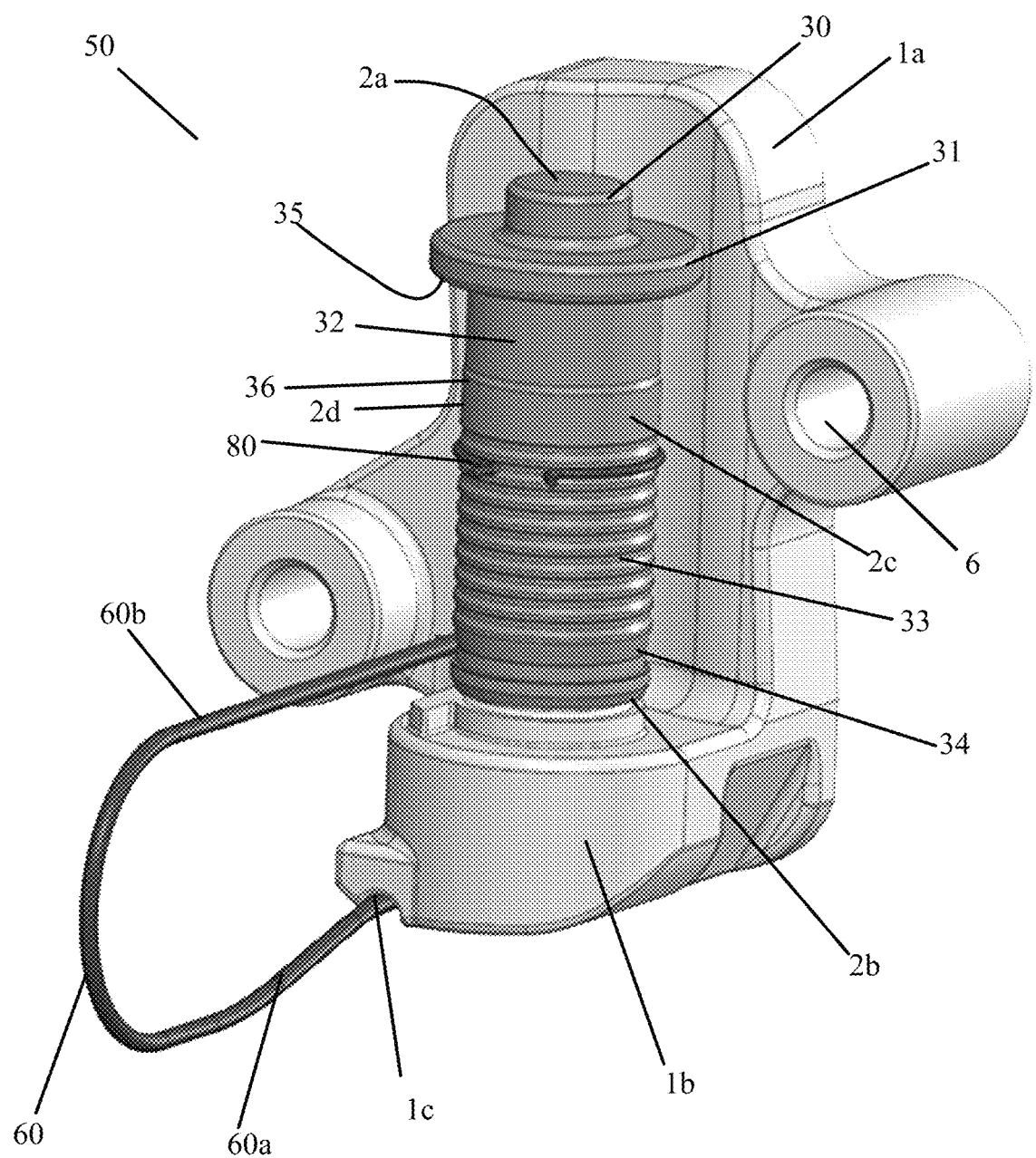
FIG. 2 shows the hydraulic tensioner with the floating ratchet sleeve removed.
Figure 3:
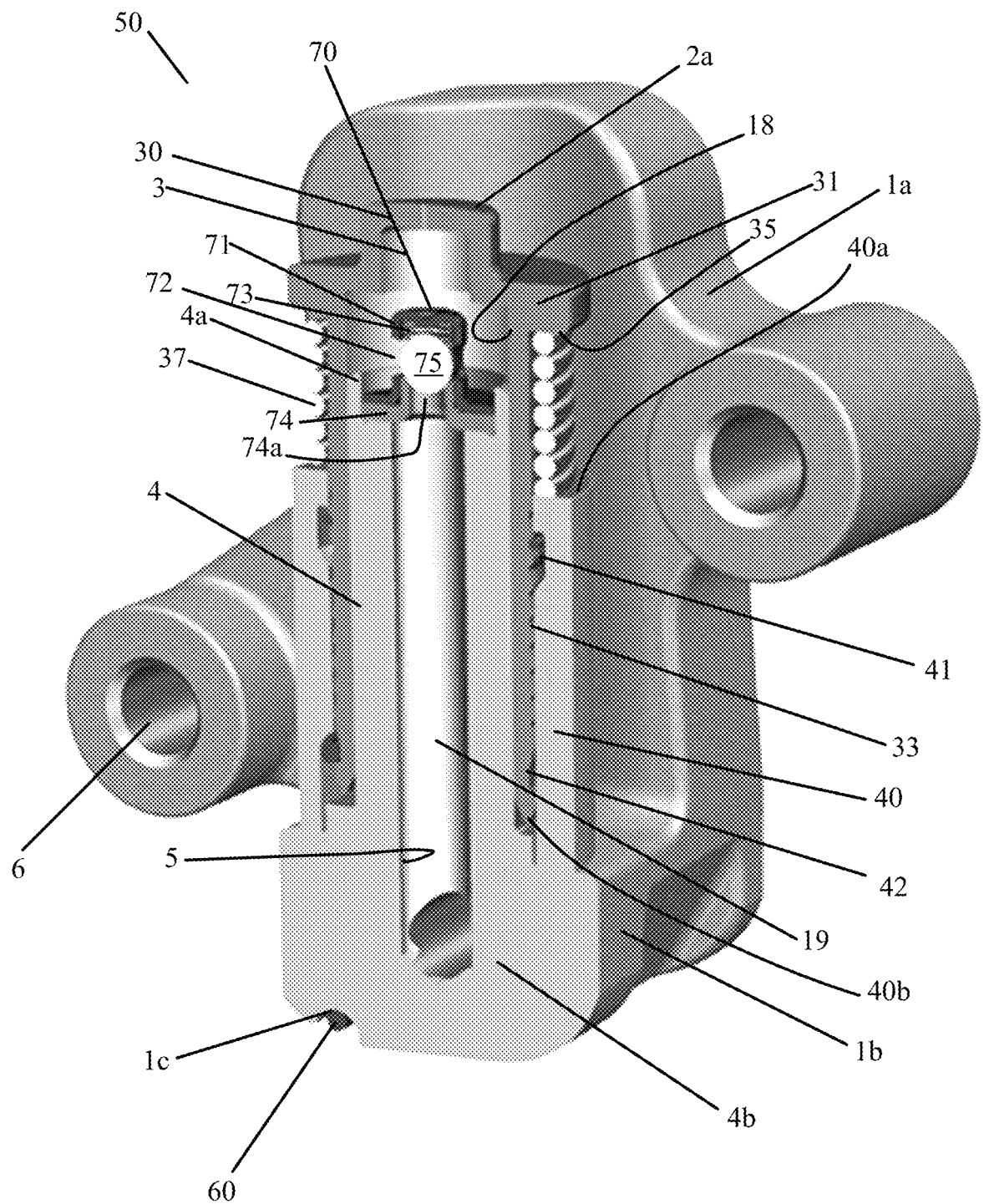
FIG. 3 shows a sectional view of the hydraulic tensioner of FIG. 1.

FIGS. 1-3 show a hydraulic tensioner of an embodiment of the present invention. The hydraulic tensioner 50 can be used in a timing drive or used in a vehicle chain drive such as a transfer case or electric vehicle drive module. The hydraulic tensioner 50 has a body 1 which allows the tensioner 50 to be bolted to an engine, for example using mounting holes 6. The body 1 can be extruded, die cast, machined from a blank, or made by other means known to the art. In one embodiment, the body is L-shaped, with the horizontal portion 1b of the L-shaped body 1 providing a surface for the tensioner 50 to be pinned to and the vertical portion 1a of the L-shaped body 1 being perpendicular to the hydraulic tensioner 50.

A hollow pin, tube or rod 4 is affixed to the horizontal portion 1b of the body 1. In some embodiments, the hollow rod 4 is formed as part of the body, press fit into the horizontal portion 1b of the body or attached using a screw thread into the horizontal portion 1b of the body 1. The hollow rod 4 has a first end 4a, a second end 4b and an internal bore 5 which is in fluid communication with an oil supply (not shown). The hollow rod 4 is preferably made from die cast aluminum, or from other materials and by other methods as required. Optionally, the hollow rod 4 is integrally formed with the body 1 and cast as a single piece.

A hollow piston 2 is slidably received around the outer surface 17 of the hollow rod 4 and within a bore 18 of the piston 2. The piston 2 has a body 2c with a first end 2a and a second end 2b. Between the first end 2a and the second end 2b of the piston body 2c is a top portion 30, a collar 31, a smooth portion 32 along on the outer circumference 2d of the body 2c, a series of ratchet teeth 33, and a shipping clip stop groove 34 along on the outer circumference 2d of the body 2c. The collar 31 extends radially outwards from the piston body 2c and forms a shoulder 35 adjacent the smooth portion 32 of the piston body 2c. Along the smooth portion 32 is an external spring groove 36. The external spring groove 36 aids in maintaining the external spring 36 on the smooth portion 32 of the outer circumference 2d of the piston 2.

A floating sleeve 40 is present around the outer circumference 2d of the piston body 2c aligned with the series of ratchet teeth 33. The floating sleeve 40 has a first end 40a and a second end 40b and defined a bore 40c. Within the bore 40c from the first end 40a to the second end 40b is a ratchet clip groove 41 and a pass-through hole 43 for receiving a shipping clip 60.

A ratchet clip 80 is received between the ratchet teeth 33 and the bore 40c of the floating sleeve. The ratchet clip 80 engages the ratchet teeth 33 of the outer circumference 2d of the piston body 2c and disengages and engages the ratchet teeth 33 within the ratchet clip groove 41 of the floating sleeve 40.

Between the shoulder 35 of the collar 31 and the ratchet grooves 33 on the outer circumference 2c of the piston body 2c hollow piston 2 and the first end 40a of the floating sleeve 40 is an external spring 37.

During shipment of the hydraulic tensioner 50 and during installation of the hydraulic tensioner 50 in the engine, a shipping clip 60 having a first leg 60a connected to the second leg 60b is used to secure the piston 2 to the floating sleeve 40 and ground the spring load from the external piston 37 between the piston 2 and the floating sleeve 40. More specifically, the second leg 60b is received within the pass-through hole 43 of the floating sleeve 40 and engages the shipping clip stop groove 34 on the outer circumference 2d of the piston 2. The first leg 60a, connected to the second leg 60b is received within a groove 1c of the horizontal portion 1b of the body 1.

A low pressure chamber (LPC) 19 is created within the internal bore 5 of the hollow rod 4. A high pressure chamber (HPC) 3 is formed between the first end 4a of the hollow rod 4, a check valve 70 and the internal piston bore 18 at the first end 2a of the piston 2 within the a top portion 30, the collar 31, and the piston body 2c.

The check valve 70 has an L-shaped valve seat 74 which is press fit into the first end 4a of the internal pin 4, such that the valve seat 74 seals the internal bore 5 of the internal pin 4 and allows fluid to flow through an opening 74a of the valve seat 74 only when a check element 75 is not seated on the valve seat 74. The check element 75 can be a ball or other shape that seal and unseal the opening 74a of the valve seat 74. A U-shaped retainer 71 encapsulates the valve seat 74 with the ends of the "U" of the retainer 71 being adjacent to the horizontal portion of the L-shaped valve seat 74. The retainer 71 has one or more holes 72. Within the retainer 71 is the check element 75 and a spring 73. The check element 75 is biased into engagement with the valve seat 74 by the spring 73 which is retained between a retainer 71 and the check element 75. Fluid can flow from the LPC 19 within the hollow rod 4, through the valve seat 74 and when the pressure of the fluid within the LPC 19 is great enough, move the check element 75 off of the opening 74a of the valve seat 74 against the bias of the spring 73, such that fluid flows through the opening 74a of the valve seat 74 and through the holes 72 of the retainer 71 into the HPC 3. The check valve 70 separates the HPC 3 from the LPC 19.

The check valve 70 can be made from different materials as needed, for example, steel or plastic. If steel is the retainer 71 can be formed by roll forming. A small hole in the check valve 71 (not shown) could be provided to allow for oil flow and subsequent "tuning" of the tensioner stiffness. The tuning may be achieved by a tortuous path in a plastic seal (not shown).

The external spring 37 creates a bias to allow the piston 2 to extend and remain extended when oil pressure is not present. By having a spring 71 external to the piston 2, there is less design constraint for load/rate. Furthermore, mounting the spring 7 on the outside of the hollow rod 4 allows for a bigger diameter spring to be used, which can reduce stress and reduce the spring rate, making less spring load variation between a new and worn chain.

Oil from the oil supply (not shown) flows into the LPC 19. From the LPC 19, fluid flows through the check valve 70 and into the HPC 3 when the force of the fluid is greater than the force of the fluid present in the HPC 3. Once the first end 2a of the piston 2 receives pressure from the belt or chain via a tensioner arm, the piston 2 compresses external spring 37, and fluid is prevented from exiting the HPC 3 by check valve 70.

In another embodiment, a second check valve can be placed between the engine oil supply and the LPC 19. The second check valve can aid in retaining oil in the LPC 19 once the engine is switched off an oil drains away from the oil supply in the engine, allowing for instant oil volume once the engine is restarted.

The floating sleeve 40 external to the piston 2 allows for application of a ratchet mechanism of the ratchet clip 80, the associated ratchet grooves 33 and the floating sleeve 40, without impacting the functional advantage the tensioner configuration provides. The floating sleeve 40 also provides a degree of freedom to allow for the addition of the ratchet function without over constraining the piston 2.

The body 1 of the tensioner 50, the floating sleeve 40, and the rod 4 are preferably made of aluminum and the piston is preferably made of steel. Forming the body 1 of the tensioner 50, the floating sleeve 40, and the rod 4 of aluminum and the piston 2 of steel reduces clearance as temperature increases. In other words, tight clearances at a high temperature and loose clearances at cold temperatures. The materials of the tensioner 50 as well as the design allow for a more stable tensioner performance over engine operating temperatures and allows for less dependency on high performance control devices to compensate for flow variability.

Figure 4:
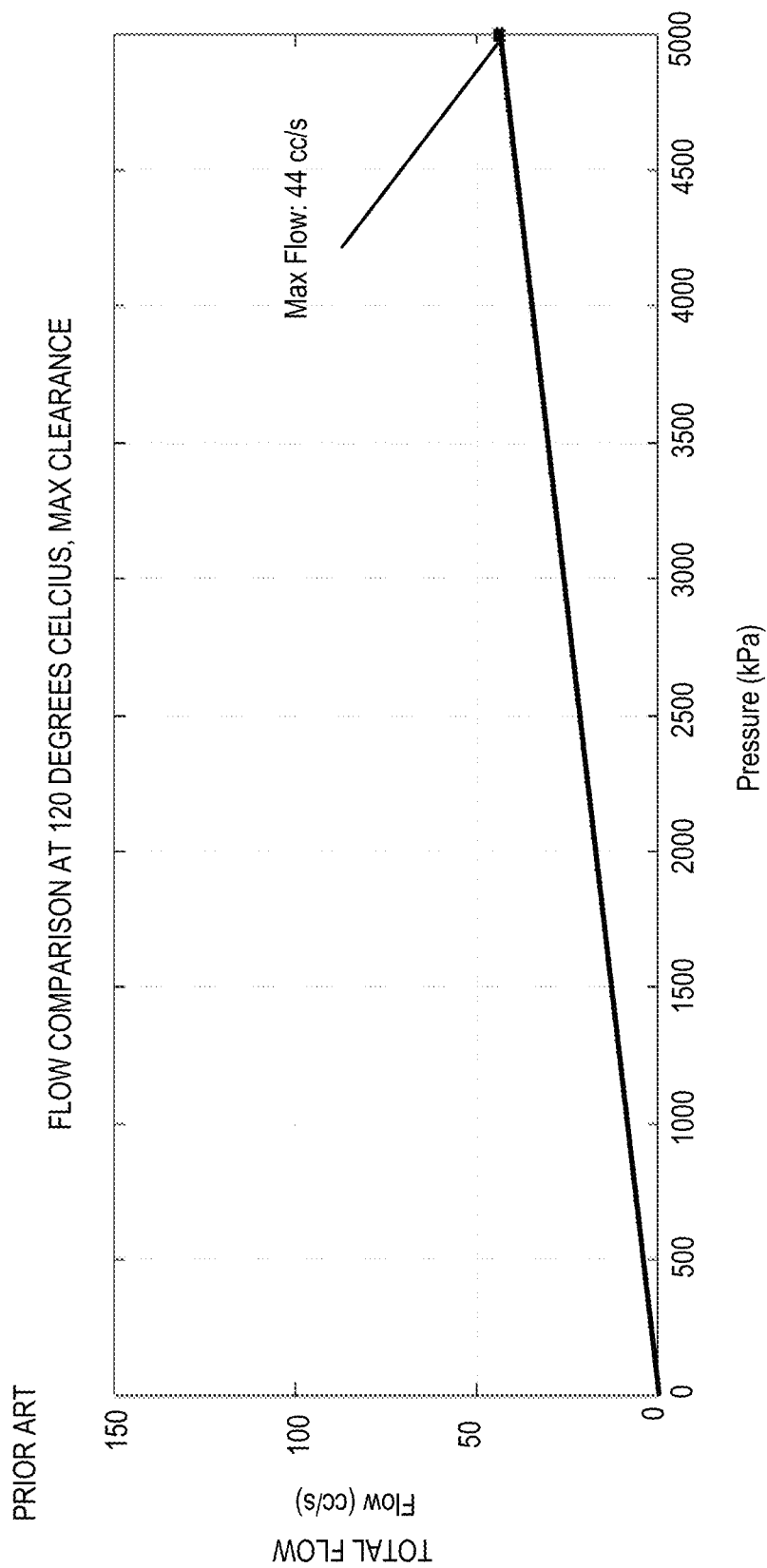
FIG. 4 shows a graph of flow versus pressure of a conventional aluminum body hydraulic tensioner at 120° C.
Figure 5:
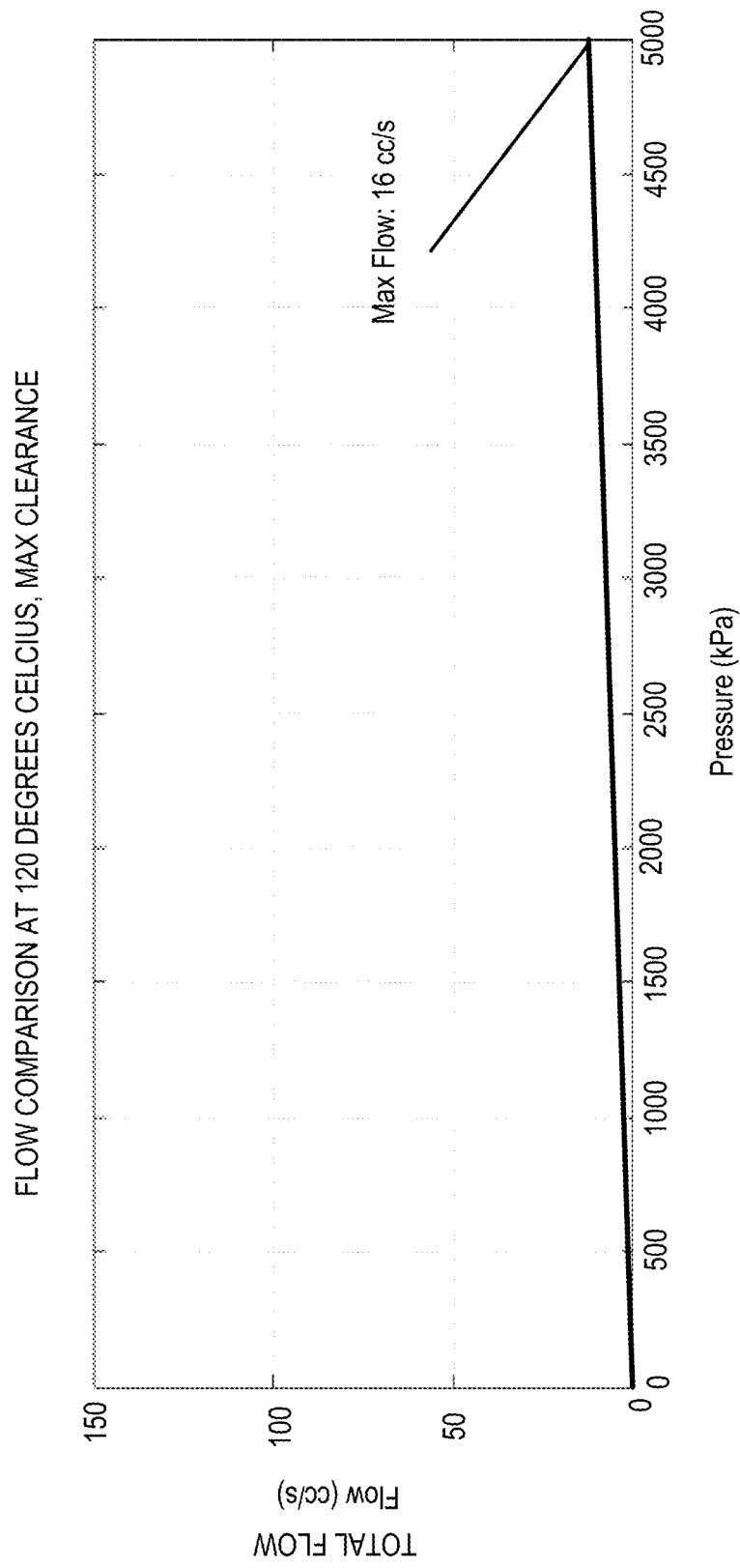
FIG. 5 shows a graph of flow versus pressure of the hydraulic tensioner of an embodiment of the present invention at 120° C.

For example, as shown in FIG. 4 a conventional aluminum body tensioner has a maximum flow of 44 cc/s at 120 degrees Celsius as shown in graph of total flow versus pressure. FIG. 5 shows the total flow versus pressure at 120 degrees Celsius for the tensioner of the present invention. The maximum flow is 16 cc/s, reducing the maximum flow by 28 cc/s.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A hydraulic tensioner comprising:
   a body;
   a rod having a first end, a second end, an outer surface and an inner bore, the second end of the rod affixed to the body, wherein the inner bore of the rod defines a low pressure chamber;
   a hollow piston slidable received around the outer surface of the rod, such that the piston slides relative to the outer surface of the rod, the hollow piston having a body defining an outer circumference and an inner bore, the body having a first end and a second end, wherein between the first end and the second end on the outer circumference of the body is a top portion, a collar extending radially outwards to form a shoulder, a smooth portion, and a plurality of ratchet teeth, the inner bore of the hollow piston and the first end of the rod defining a high pressure chamber;
   a moveable sleeve surrounding the outer circumference of the body of the hollow piston and aligned with the plurality of ratchet teeth, the moveable sleeve having a first end, a second end, and a bore defining a ratchet clip groove;

an external spring between the first end of the moveable sleeve and the shoulder of the collar of the hollow piston, providing a force between the moveable sleeve and the shoulder of the collar of the hollow piston, biasing the hollow piston outwardly relative to the body;

a ratchet clip received between the plurality of ratchet teeth and the moveable sleeve to engage the plurality of ratchet teeth; and a check valve received within the bore of the hollow piston and within the first end of the rod to control fluid flow between the low pressure chamber and the high pressure chamber.

2. The hydraulic tensioner of claim 1, wherein the body is L-shaped, such that the piston is perpendicular to a vertical portion of the body and mounted to a horizontal portion of the body.

3. The hydraulic tensioner of claim 1, wherein between the series of ratchet teeth and the second end of the body of the piston is a shipping clip stop groove.

4. The hydraulic tensioner of claim 3, further comprising a shipping clip, wherein a first leg of the shipping clip is received by the body and the second leg is received within a pass-through hole of the movable sleeve, engaging the shipping clip stop groove of the body of the piston, securing the movable sleeve and the piston in a fixed position.

5. The hydraulic tensioner of claim 1, wherein the smooth portion of the outer circumference of the body of the piston further comprises an external spring groove to engage and maintain the external spring in place on the piston.

6. The hydraulic tensioner of claim 1, wherein the check valve further comprises: a valve seat within the first end of the rod defining a hole and a seat; a checking element moveable between sealing and unsealing the hole of the valve seat; a retainer defining a plurality of holes and encapsulating the check element; and a spring between the retainer and the check element, biasing the check element to seal the hole of the valve seat.

7. The hydraulic tensioner of claim 1, wherein the second end of the rod is press fit into the body.

8. The hydraulic tensioner of claim 1, wherein the second end of the rod is formed integrally with the body.

9. The hydraulic tensioner of claim 1, wherein the rod is formed of aluminum.

10. The hydraulic tensioner of claim 1, wherein the moveable sleeve is formed of aluminum.

11. The hydraulic tensioner of claim 1, wherein the piston is formed of steel.

12. The hydraulic tensioner of claim 6, wherein the retainer is comprised of steel and is formed by rolling.

* * * * *